(12) United States Patent
Price et al.

(10) Patent No.: US 7,556,736 B2
(45) Date of Patent: Jul. 7, 2009

(54) PROCESS AND SYSTEM FOR CONVERTING BIOMASS MATERIALS INTO ENERGY TO POWER MARINE VESSELS

(76) Inventors: Leslie Dean Price, 1315 Scott's Run Rd., McLean, VA (US) 22102-2808; Terry R. Galloway, 6801 Sherwick Dr., Berkeley, CA (US) 94705-1744; H. F. William Perk, 1524 E. Gary Dr., Carbondale, IL (US) 62901

( * ) Notice: Subject to any disclaimer, the term of this patent is extended or adjusted under 35 U.S.C. 154(b) by 662 days.

(21) Appl. No.: 11/166,930

(22) Filed: Jun. 24, 2005

(65) Prior Publication Data
US 2007/0017864 A1 Jan. 25, 2007

Related U.S. Application Data

(60) Provisional application No. 60/631,129, filed on Nov. 26, 2004.

(51) Int. Cl.
*C02F 3/00* (2006.01)
(52) U.S. Cl. .................. 210/603; 210/242.3; 518/702
(58) Field of Classification Search .......... 210/242.1, 210/603; 48/197 R; 435/41; 518/702
See application file for complete search history.

(56) References Cited

U.S. PATENT DOCUMENTS

| | | | |
|---|---|---|---|
| 3,982,963 A * | 9/1976 | Mahoney et al. | 136/251 |
| 5,593,579 A | 1/1997 | Reynolds | |
| 5,787,832 A * | 8/1998 | Spinka | 114/123 |
| 6,680,137 B2 * | 1/2004 | Paisley | 429/19 |
| 2004/0180971 A1 | 9/2004 | Inoue et al. | |
| 2005/0113467 A1 | 5/2005 | Branson | |

* cited by examiner

*Primary Examiner*—Alexa D Neckel
*Assistant Examiner*—Imran Akram

(57) ABSTRACT

The process and system of the invention converts biomass materials into energy to power a large marine vessel without the problematic environmental releases of either liquids to the sea or greenhouse gases to the atmosphere. The biomass is conveyed to an on-board biomass storage facility and converted to synthesis gas in an on-board gasification unit to synthesis gas that is used as fuel for fuel cells to power the marine vessel. A portion of the biomass is sea biomass harvested from the sea and removed from the sea by on-board biomass removal means that strains the biomass from the sea water and flips the biomass into a holding bin before being conveyed to the biomass storage facility. A portion of the synthesis gas is converted to useful products. These products are partially used as fuel for the fuel cells. The remaining products are off-loaded at port facilities where biomass waste materials are loaded on-board and conveyed to the biomass storage to serve as the remaining portion of biomass.

15 Claims, 15 Drawing Sheets

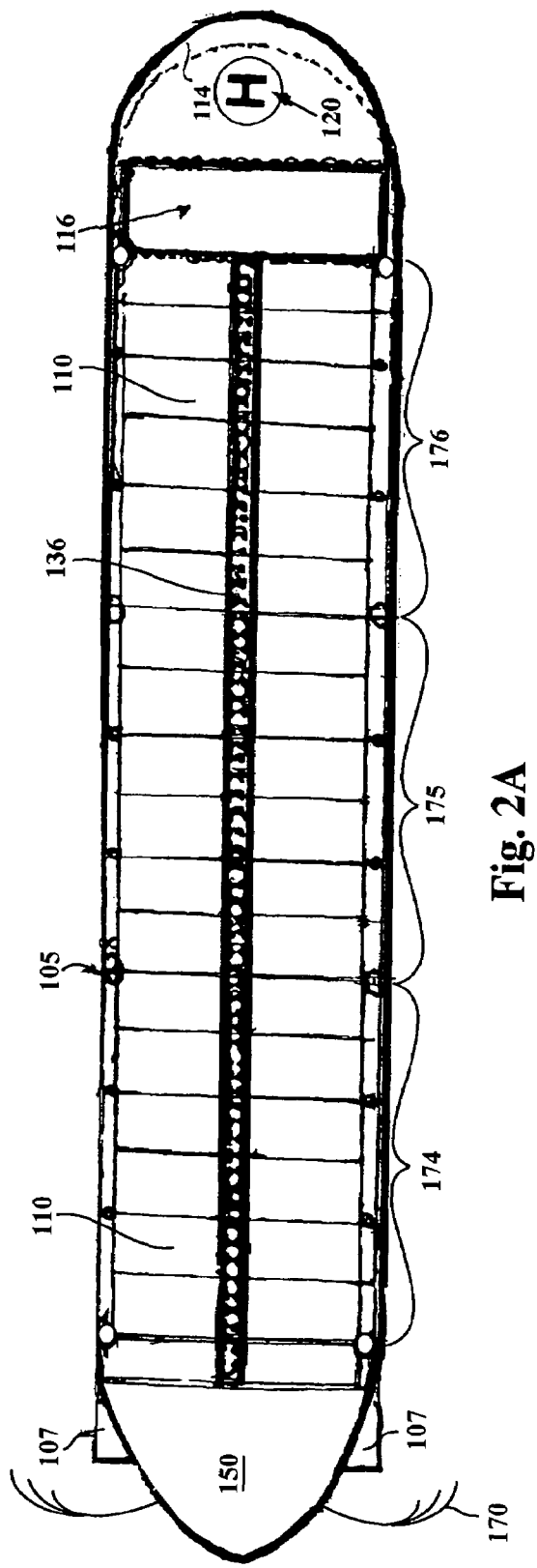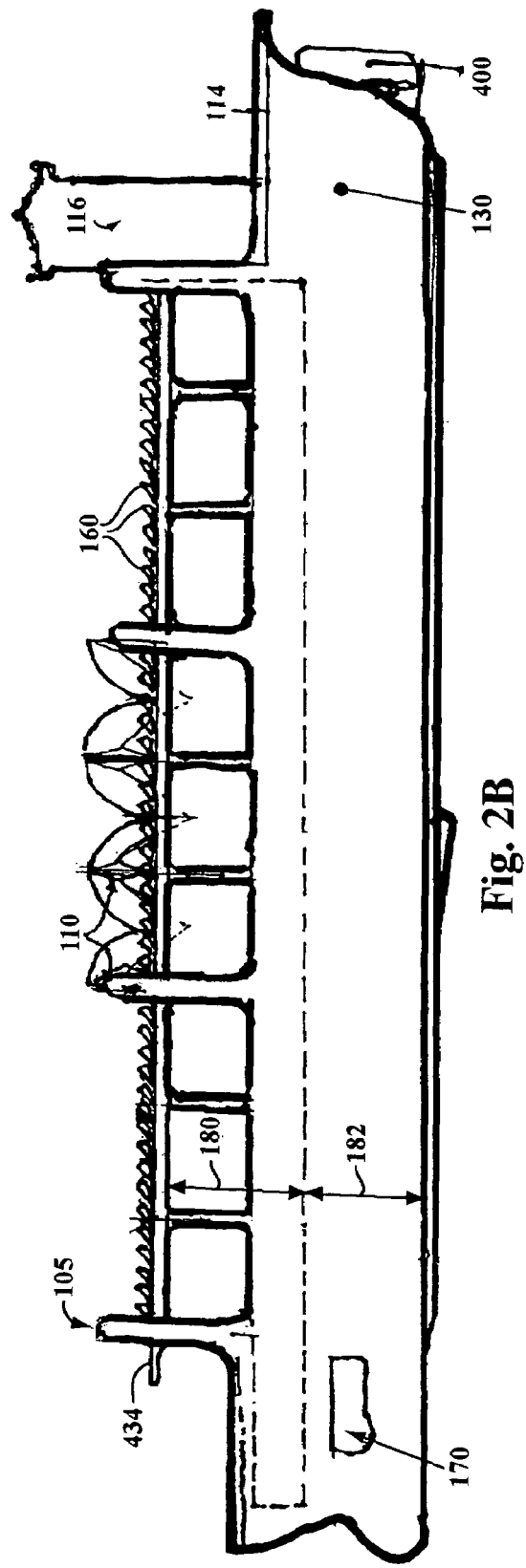
Fig. 2A
Fig. 2B

US 7,556,736 B2

PROCESS AND SYSTEM FOR CONVERTING BIOMASS MATERIALS INTO ENERGY TO POWER MARINE VESSELS

CROSS REFERENCE TO RELATED APPLICATION

This application claims the benefit of U.S. provisional application Ser. No. 60/631,129, filed Nov. 26, 2004.

FIELD OF INVENTION

The present invention relates generally to a process and system for converting biomass materials into renewable energy to power large marine vessels, such as super cargo container ships, and other large marine vessels.

BACKGROUND OF THE INVENTION

Conventional propulsion of large marine vessels, such as super cargo container ships, super oil tanker ships, aircraft carriers, and the like are powered by fossil fuels. All of these vessels are major sources of pollution and are detrimental to the environment. Conventional power plants are also environmentally abusive and harm the world economy with high costs and the increasingly dwindling natural resources. Biomass materials in the form of carbonaceous waste on the other hand is increasing annually and becomes the most abundant and bothersome to the environment as well as having a negative impact on the world economy. In addition, land use is harmed by continually expanding landfills for such waste. Shipping and most other forms of transportation are becoming less economical as a result of the high cost of oil and other fossil fuels. The oceans are being choked with algae and other sea biomass and these sea biomass materials are considered a form of an oceanic nuisance or pollutant.

There is a growing need to begin to switch fossil fuel to other available sources of fuel to power large ships. There is also a need of making beneficial use of biomass waste materials as well as unwanted sea biomass pollutants.

SUMMARY OF THE INVENTION

The process and system of the present invention overcomes these needs by converting biomass materials into energy to power marine vessels. The present process comprises:

a) conveying the biomass to an on-board biomass storage facility;
b) converting the biomass from the on-board biomass storage facility in an on-board gasification unit to synthesis gas; and
c) passing a portion of the synthesis gas from the gasification unit as fuel for a power system of the marine vessel.

In one embodiment of the present invention, the biomass used for the on-board conversion to synthesis gas is sea biomass that includes kelp, algae, marine organic materials, and mixtures thereof. The sea biomass is harvested from the sea by passing sea water from an intake mounted on the exterior of the vessel and stored in on-board biomass facilities. The sea water that enters the intake passes through an on-board biomass removal means for harvesting the biomass before the processed sea water is returned to the sea through an outlet. The on-board biomass removal means includes a biomass holding bin, a flipper system for flipping the sea biomass harvested from the sea water into the holding bin, and a conveying system for conveying the sea biomass to the on-board biomass storage facility. The sea biomass is conveyed from the on-board storage facility via a conveyor means such as an on-board rotary feeder to the on-board gasification unit.

In another embodiment, the biomass that is stored in the on-board storage facility and used for the on-board conversion to synthesis gas is carbonaceous waste materials. The materials include carbonaceous-containing waste oil; carbonaceous-containing medical waste; carbonaceous-containing industrial waste including hazardous waste, insecticides, pesticides, fumicides, algaecides, and the like; carbonaceous-containing sewage sludge and municipal solid waste (MSW); carbonaceous-containing agricultural waste; carbonaceous-containing biomass, biological and biochemical waste; and mixtures thereof.

BRIEF DESCRIPTION OF THE DRAWINGS

FIGS. 2A and 2B is respectively a top view and a port side elevation view of the container ship of FIG. 1;

DETAILED DESCRIPTION OF THE INVENTION

In a preferred embodiment of the process and system of the present invention described in detail below, existing super tankers or other large marine vessels, e.g. super cargo ships, super oil tankers, aircraft carriers, and tourist ships, normally fueled by oil having a standard length of over 1,200 feet, are re-configured as follows: (1) to accept carbonaceous waste at a port side facility; (2) to convert the waste in an on-board gasification unit to synthesis gas to provide fuel to power the ships; (3) to utilize the sun in an on-board solar energy power system; (4) to produce a range of products from the waste while sailing to another port to deliver products and pick up new waste; (5) to harvest sea biomass while the ships are enroute between ports to increase the efficiency and economic improvement of the overall operation; (6) and to avoid problematic environmental releases of either liquids to the sea or greenhouse gases to the atmosphere.

A proper balance is maintained between the picking up of the carbonaceous waste and delivering products at a port side facility, the harvesting of sea biomass, the on-board production of products, and the conveying of the sea biomass and products to their respective on-board storage. One of the products that can be produced on-board is methanol by converting at least a portion of the synthesis gas from the gasification unit. Methanol is combined with clean water to form a non-combustible mixture that can be stored and off-loaded at port side. Preferably, at least a portion of the methanol-water mixture is used as an auxiliary fuel for fuel cells used in the ship's power plant. The fuel cells are primarily designed to operate on the synthesis gas (syngas) produced on-board from the biomass. An additional on-board fuel for the fuel cells is tertiary hydride stored as a non-combustible compound; see Jansen, et al, *Exoskeleton for Soldier Enhancement Systems Feasibility Study*, September 2000. The clean water is stored at both port and starboard sides of the ship so that it is in continuous gravity balance and vertically compartmentalized with, for example, intake piping on the port side and outlet pumped piping on the starboard side. The fuel cell fuel and other products are stored in secondary storage compartments on port and starboard sides with the same arrangement of inlet-outlet piping with vertical compartments as that of the clean water.

Figure 1:
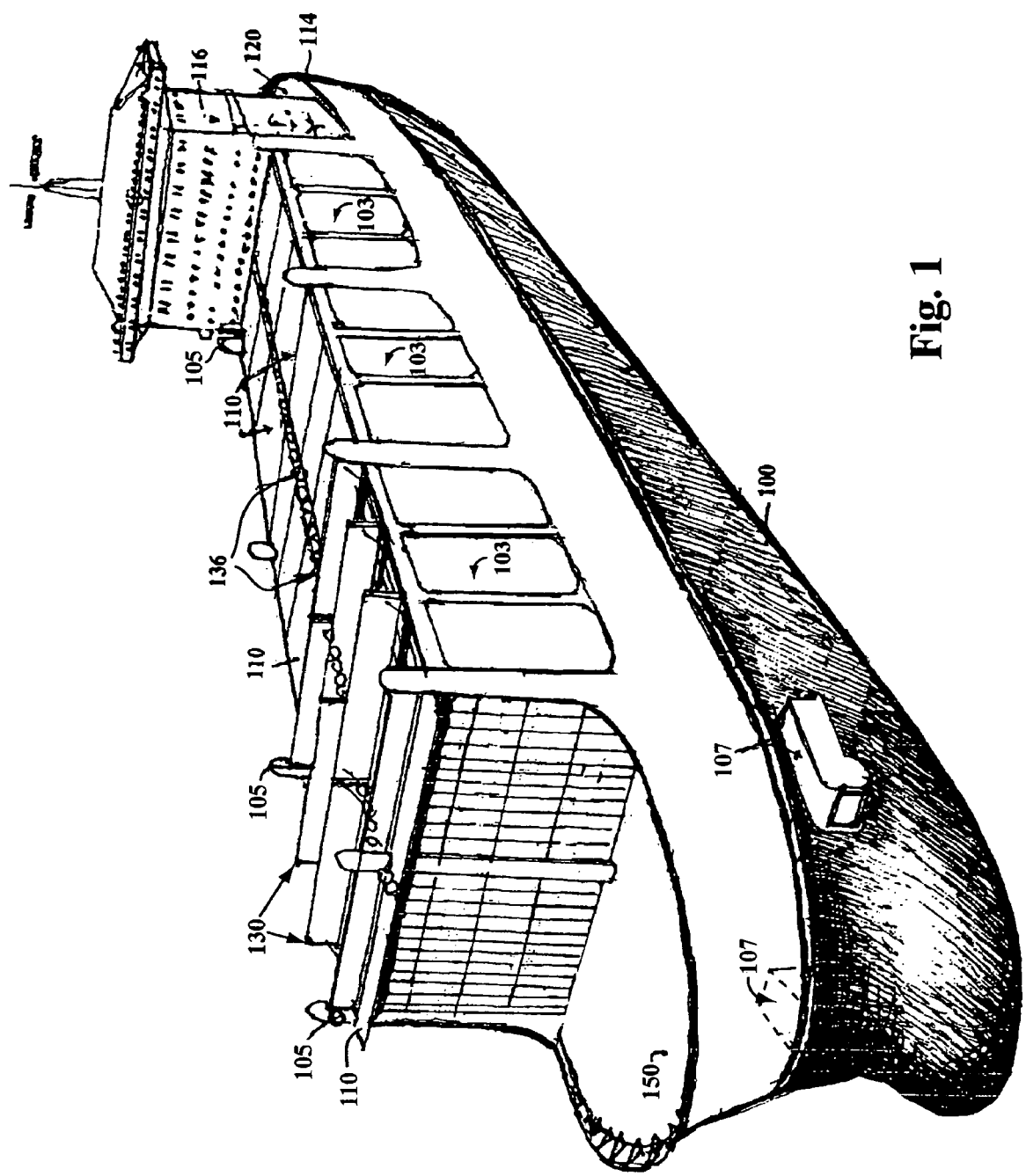
FIG. 1 is an overall perspective of a super cargo container ship modified to carry out one embodiment of the process of the present invention for converting sea biomass and biomass waste materials into energy.

FIGS. 1, 2A and 2B show the overall features of a super cargo container ship 100 in accordance with one embodiment of the process of the present invention. In this embodiment, the model super cargo container ship 100, which preferably has a length, L, from bow to stem of about 1200 ft., a width, W, from port to starboard of about 200 ft. and cargo/container holds occupying a mid-ship distance of about 900 ft., has been modified to carry out the process of the present invention for converting sea biomass and waste materials into energy. Within the mid-ship distance is located three bays 103 separated by towers 105. Ship 100 has a sea biomass pollution management (SBPM) system 107 extending outwardly from the port and starboard sides to be described in detail below in connection with FIGS. 13-15. A series of bottom hinged photovoltaic (PV) vertical opening doors 110 are components of the solar collector concentrator system and serve as cargo deck hatch cover doors 110. Stem 114 of ship 100, preferably having a length of approximately 170 ft., supports a bridge control center and crew's quarters and control center 116 and contains a heliport 120.

Each of the doors 110 is placed in a horizontal position, as shown in FIG. 2A, during a voyage to catch the sun's rays. Preferably, each door 110 is about 90 ft. long and 50 ft. wide, and is made up of 2 layers of photovoltaic (PV) power cells in a sandwich with the thermal composite material (TCM) coffered structure. The bottom layer of doors 110 is preferably composed of a PowerLight's PowerGuard® solar electric systems for flat roofs, which is utilized to mine the solar heat to be stored for use for the electrical system of ship 100. The top layer of door 110 is preferably composed of a 4 ft. by 6 ft.-300 W peak capacity PV module manufactured by RWE Schott Solar, Inc. for the electrical production and storage for ship 100. An insulation layer is operably positioned between the top and bottom layers to complete the PV cell system sandwich of doors 110.

Figure 10:
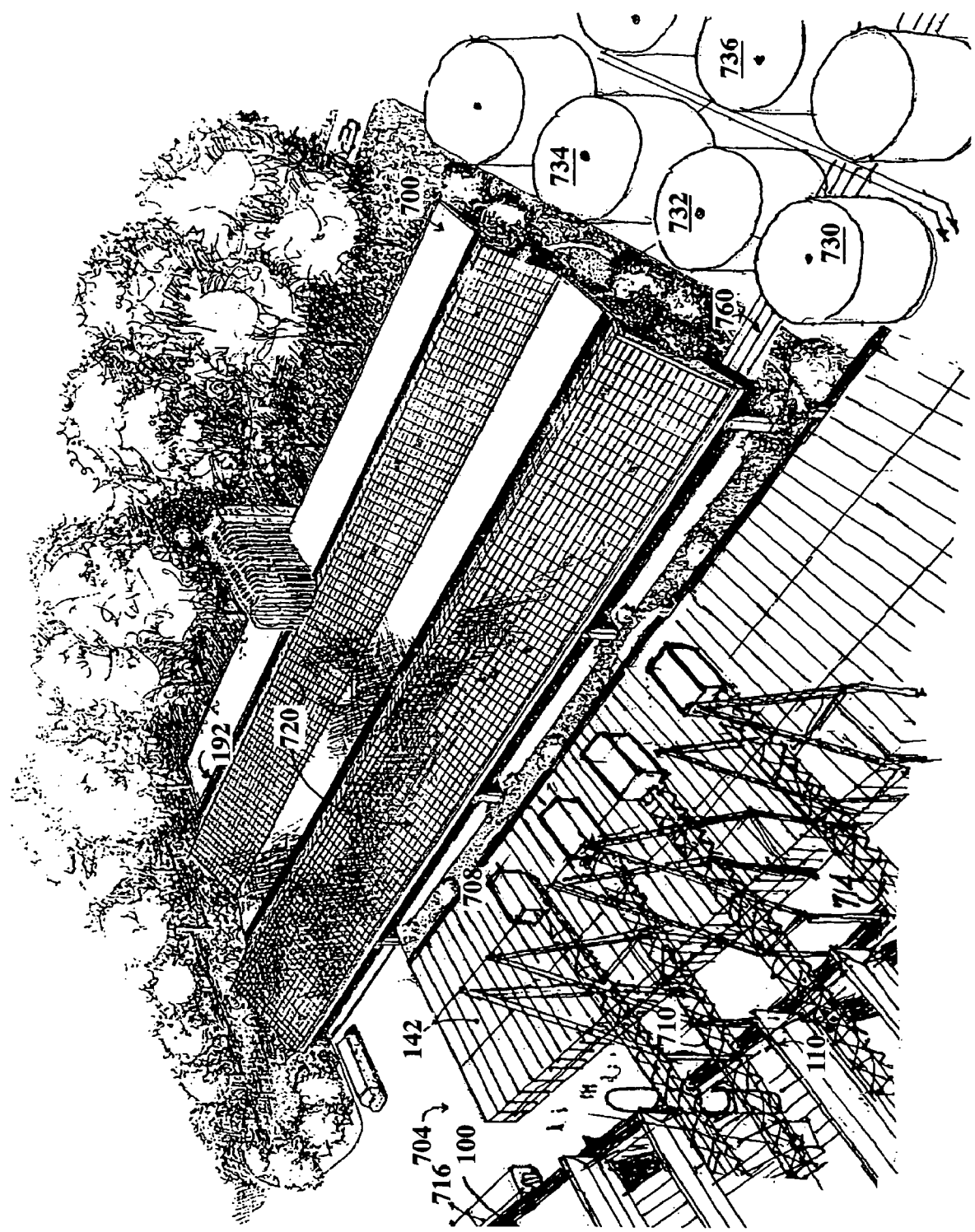
FIG. 10 is an overall perspective of a port-side storage facility for the container ship of FIG. 1.

Doors 110 in FIGS. 1 and 10 are shown in their upright cargo/container loading position. Doors 110 are hinged to a TCM lateral ship's beam or central access spine 136, and the doors are raised by conventional means, for example, electrically operated hydraulic universal jointed jacks 138 shown in FIG. 3 at each hatch door's end. These lifting jacks 138 can be coordinated to an operating computer control system at the control center 116. A manual back-up is provided to open and close the doors. Each door 110 is provided with a watertight seal around the entire periphery. In addition, a water tight linkage lip astragal is preferably used to secure the position of the center line of the doors in the down position.

There are 9 TCM towers 140 that contain small crew elevators and circular ladder stairs to access the cargo/container holds and all ship levels at key points within ship 100. Containers 142 are stacked 6 container levels high in the main mid-ship hold and 2 levels high in the prow 150, preferably having a depth of about 172 ft. FIG. 1 shows containers 142 stacked 4 containers high above deck for a total height of about 56 ft. with 11 containers in each level on the port and starboard sides of bay 103. Ship 100 is designed to transport a total of 2,658 containers.

Figure 3:
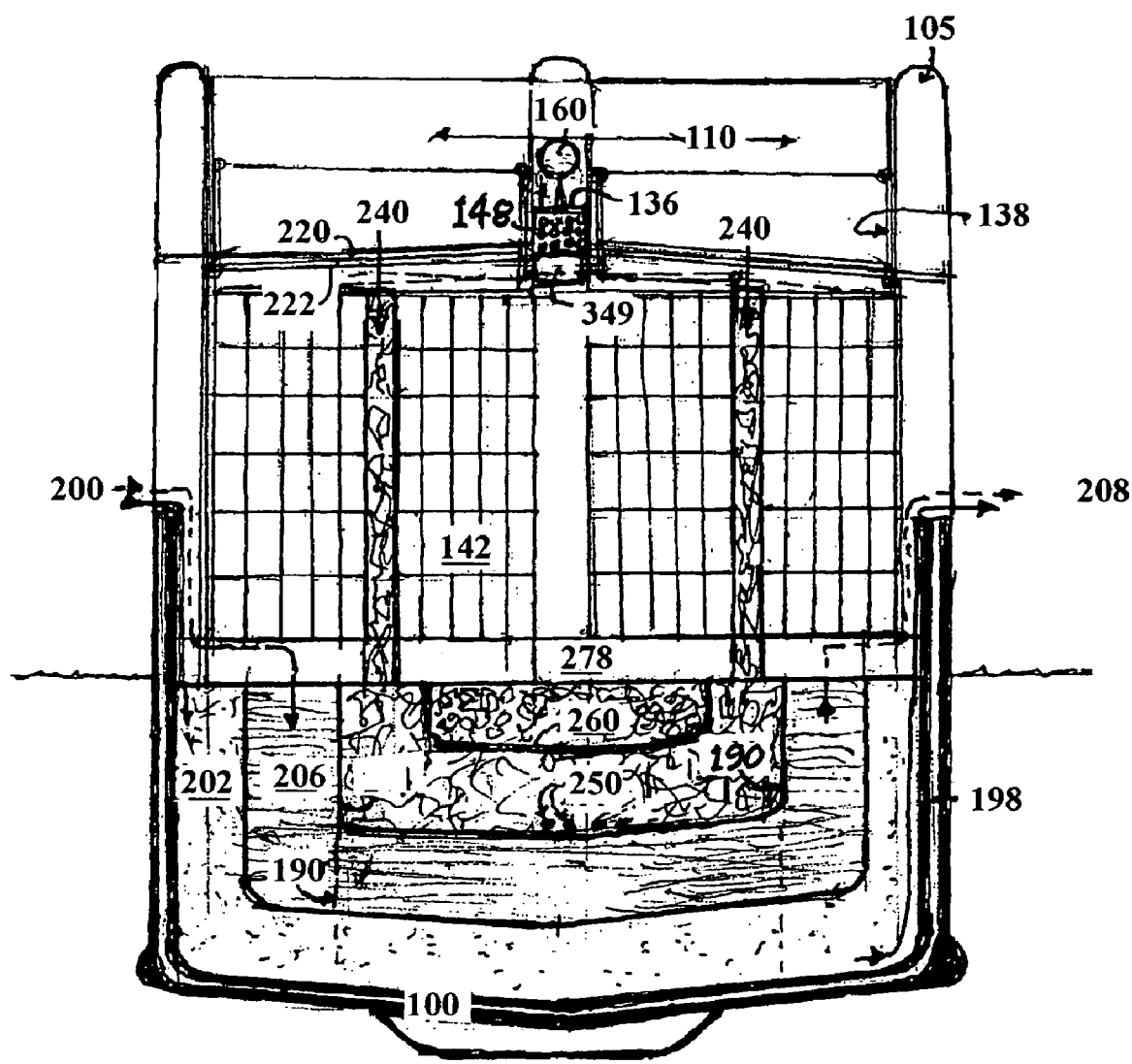
FIG. 3 is a cross-section view through the hull of the container ship of FIG. 1.
Figure 4:
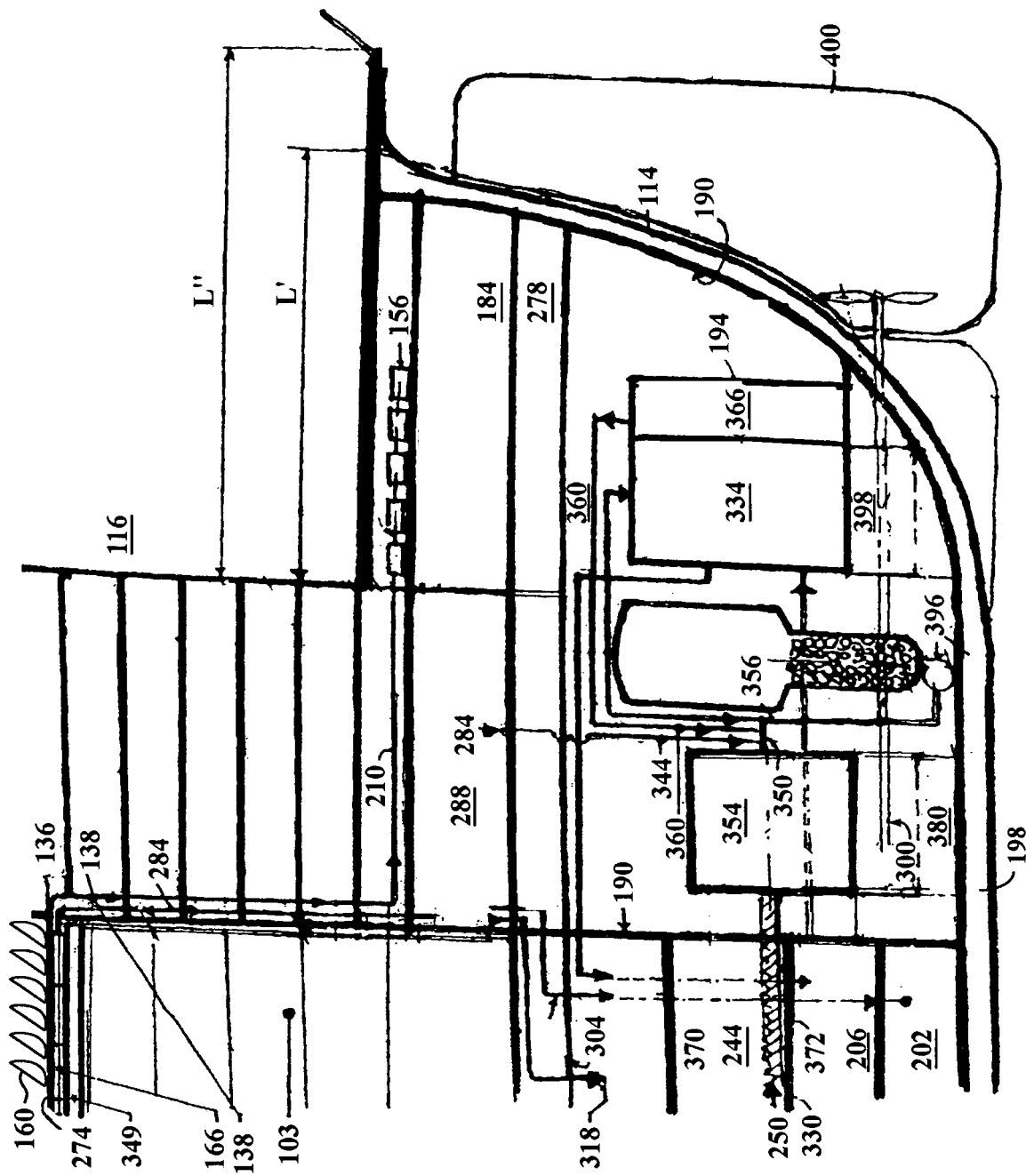
FIG. 4 is a cross-section side view of the stern of the container ship of FIG. 1.

Central spine 136 contains a walkway about 8 ft. wide and rows of electrical connections 148 (shown in FIG. 3) from the main hatch cover PV system of doors 110 to an electric traction battery storage system 156 (shown in FIG. 4). The rows of connections 148 are elevated to allow for head clearance above the walkway within spine 136. Mounted along the exterior of spine 136 are approximately 154 solar tracking concentrators/solar tracking Stirling engine systems 160 of the solar system. In addition on the top of control center 116, are about 90 solar tracking concentrators 116. The TCM structural form of doors 110 is tapered from the middle of each 50 ft. wide hatch door to the end to receive the head of each end of the lifting jacks 138. Spine 136 also contains medical oxygen storage tanks 166 (shown in FIG. 4) lying horizontal in clustered compartments separated from each other with automatic filling and shut-off systems and fire safety devices. Access to these oxygen tanks 166 are through vertical opening sealed doors (not shown) in the walkways within spine 136.

The port and starboard SBPM system 107 include a retractable sea broom whiskers (SBW) 170. These automatic port and starboard retractable skimmer devices 170 are composed of TCM. SBW 170 are used on those occasions when the sea containing floating debris that is not to be harvested by the system and are controlled from the central computer controls in control center 116.

FIG. 2A more clearly shows the three 300 ft. hold divisions or bays 174, 175 and 176 that equal the approximately 900 ft. of mid-ship hold space and the PV hatch doors 110 that cover the openings in the cargo/container bays 103. Each 300 ft. bay has 6 starboard doors and 6 port doors for a total of thirty six 50 ft. by 90 ft. PV hatch cover doors 110. Each door 110 is respectively sloped to the starboard and port sides to allow for drainage from automatic clean water washing system (not shown). The washing system has nozzles located along each side of interior of spine 136. The washing system is also controlled from control center 116.

FIG. 2B shows three PV hatch cover doors 110 in their up and open position to receive cargo and the six levels 180 of containers and the level 182 for storage of various fuels for the fuel cells 184 (shown in FIG. 4). The renewable energy power plant and process zone 190 is located in the stem 114 and contains the E-Macrosystem 194 (shown in FIGS. 4 and 9).

Referring to FIG. 3, the cross section view through the double hull 198 of ship 100, the port and starboard hatch cover doors 110 are shown between towers 105 in their open vertical position for gantry loading of containers (shown in FIG. 10). Intake pumping system 200 is shown on the port side for pumping various fluids to and from ship 100 including clean water and a mixture of water and methanol to serve as the fuel for fuel cells 184. The clean water is pumped to clean water storage system 202 and the fuel cell fuel is stored in fuel cell storage system 206. Outtake pumping system 208 is shown on the starboard side for pumping fluids such as the fresh water and fuel cell fuel from the respective storage systems 202 and 206. Spine 136 is shown with the electrical connection lines 138 running along the top of the interior of spine 136. Top layer 220 and bottom layer 222 of PV power cells of doors 110 are shown for starboard and port doors 110 in the sloped, closed position. Below doors 110 are cargo containers 142 stacked 6 deep.

The port side position of the typical lifting jacks 138 is shown in FIG. 3 attached to the center door edges made of TCM meeting the requirements of Howard T. Odum's emergy (all the available energy that is used in the work of making a product and expressed in units of one type of energy) analysis and sea environment parameters. The location of solar elevated concentrators and/or solar Stirling engines 160 is shown above spine 136. Typical port and starboard intake chutes 240 are two of the four chutes used to gravity feed the biomass to biomass storage 244. The chutes 240 are equipped with electrically operated covers and motors (not shown). At the bottom of biomass storage system 244 are positioned the four hot screws 250 to transfer the biomass to the E-Macrosystem 194 located in the ship's power plant 190. Hydride storage 260 within a thermally insulated compartment is positioned above the biomass storage 244. An interstitial structural access space 278 in the level of ship 100 is located on the port and starboards sides just below the cargo containers 142. Access space 278 is for the crew to access miscellaneous cargo horizontally through ship 100 and for crew support. Typical two electrically operated hatch cover door universal lifting jacks 138 per cover door 110 are equipped with manual mechanical crank lifting auxiliary systems. At the center line at each end of the PV hatch doors 110 is a jack bearing to accommodate lifting jacks 138.

FIG. 4 is a side elevation view of the interior of stern 114 of ship 100. The preferred width, W', of the control and crew quarters tower 116 is about 72 ft., the preferred length, L', of heliport 120 is about 100 ft., and the preferred length, L", from towers 116 to the end of the stem is about 120 ft.

Stem 114 contains the elements of the E-Macrosystem 194 of the ship's power plant 190 that converts waste and solar energy to meet the large marine power requirements of ship 100, as well as producing methanol as a useful by-product. Solar tracking concentrator systems 160 are mounted to the exterior of spine 136. Medical oxygen storage tanks 166 are mounted below the spinal walkway within spine 136. Solar electrical connection lines 138 run between the solar tracking concentrators/solar tracking Stirling engine systems 160 to electric traction battery storage system 156. Oxygen lines 284 connect the electrolyzer system 288 to oxygen storage tanks 166. The main electric line 148 feeds into electrical storage 280. Fuel cells 184 are located at the stem adjacent the double walled hull 198 to control both high and low temperature fuel cells 184. The interstitial structural access space 278 is also located below the level in the stem 114 containing electrolyzer system 288 and fuel cells 184. Hydrogen piping 300 connects electrolyzer system 288 to a hydrogen storage system 304. A clean water line 310 connects electrolyzer system 288 to clean distilled water storage 202. A hydrogen line 318 connects electrolyzer system 288 to the hydride fuel storage 260 for fuel cells 184. A methanol storage tank 330 from the methanol plants 334 is fed via methanol line 336 to supply methanol and clean water mix fuel storage 206 used for fuel cells 184. A hydrogen line 344 connects the electrolyzer system 288 to the main line 350 from the biomass rotary feeder 354 into steam reformers 356. The type of steam reformers that can be used in the E-Macrosystem 194 of the present process is described in U.S. Pat. No. 6,187,465, the details of which are incorporated by reference herein.

A carbon dioxide recycle line 360 from the oxidizer catalyst heat exchanger 366 also connects to the main line 350. The top 370 and bottom 372 of the biomass storage area 244 are shown more clearly in FIG. 7. The biomass is fed from biomass storage area 244 via four hot screws 250 to biomass rotary feeders 354. Auxiliary electric turbines 390 are mounted on the power plant floor 380 (shown in FIG. 5) to operate as an alternative to the ship's screws 392. Water jet propulsion and guidance systems can be used to operate screws 392. A service space 396 is used for maintenance of the turbines. Turbines 398 provide for propulsion and guidance for an optional screw propulsion system. A rudder and its control system 400 is mounted to stern 114 as shown in FIG. 4.

Figure 5:
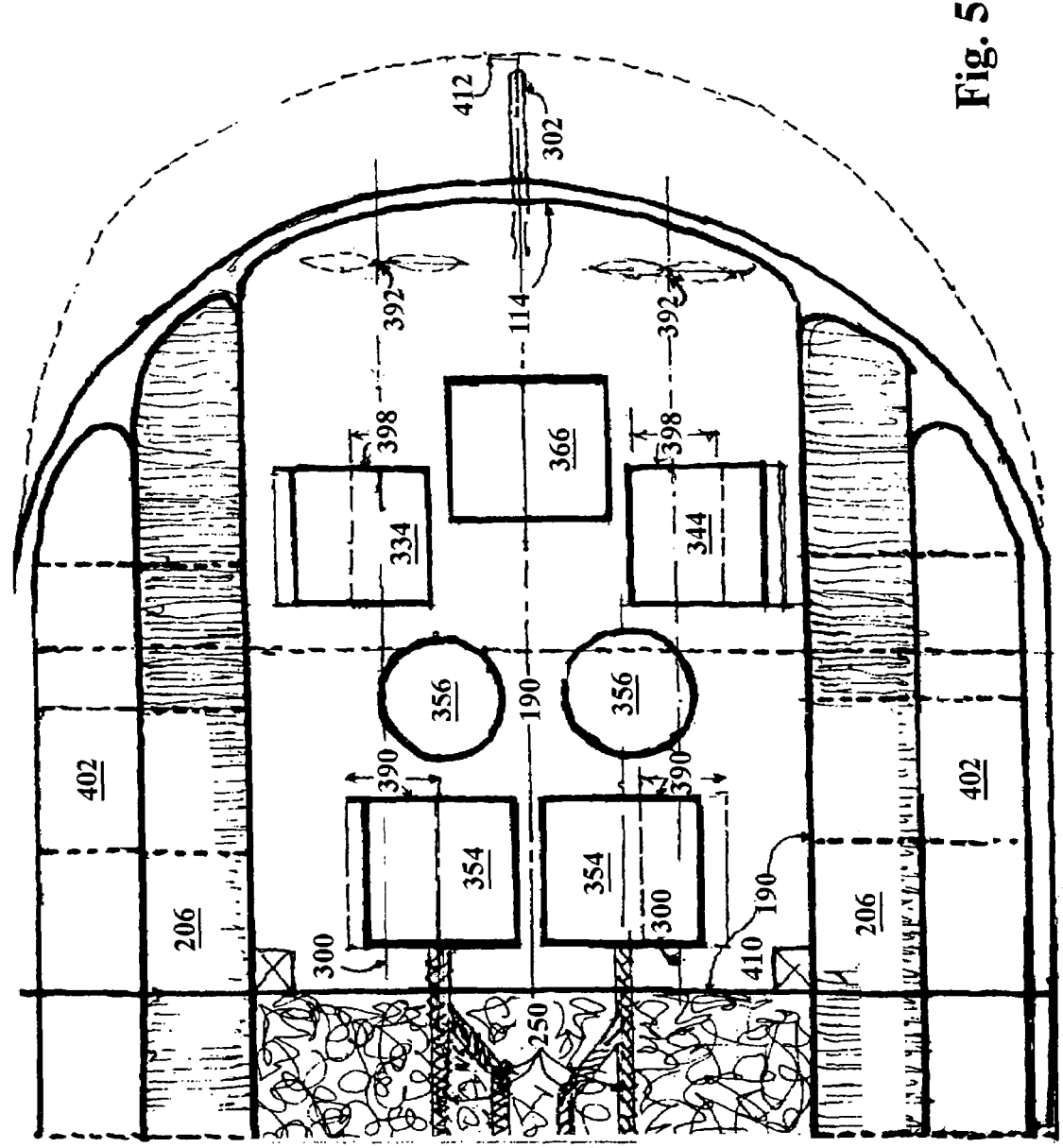
FIG. 5 is a top plan view of the stem of the container ship of FIG. 1.

FIG. 5 is a top interior view of the power plant level in stem 114. Both the starboard and port sides of the distilled clean water storage 202 contain vertical partial TCM separators 402. Similarly, the starboard and port sides of the methanol and distilled clean water mix storage 206 as fuel for fuel cells contain vertical partial TCM separators 402. The lower access 410 of towers 140 that contain small crew elevators lead to the floor level of the entire main power plant 190. The power plant 190 includes the following elements: two auxiliary electric turbines 390 to power the ship's screws 392, numbers 1 and 2 biomass rotary feeders 354, numbers 1 and 2 methanol plants 334, numbers 1 and 2 electric turbines 398 to power the propulsion and guidance system, numbers 1 and 2 steam reformers 356, the four hot screws 250, the optional screw propulsion system 300, and the ship's rudder 302. The dotted line 412 represents the outer limits of the heliport 120 above the power plant having a radius of about 120 ft.

Figure 6:
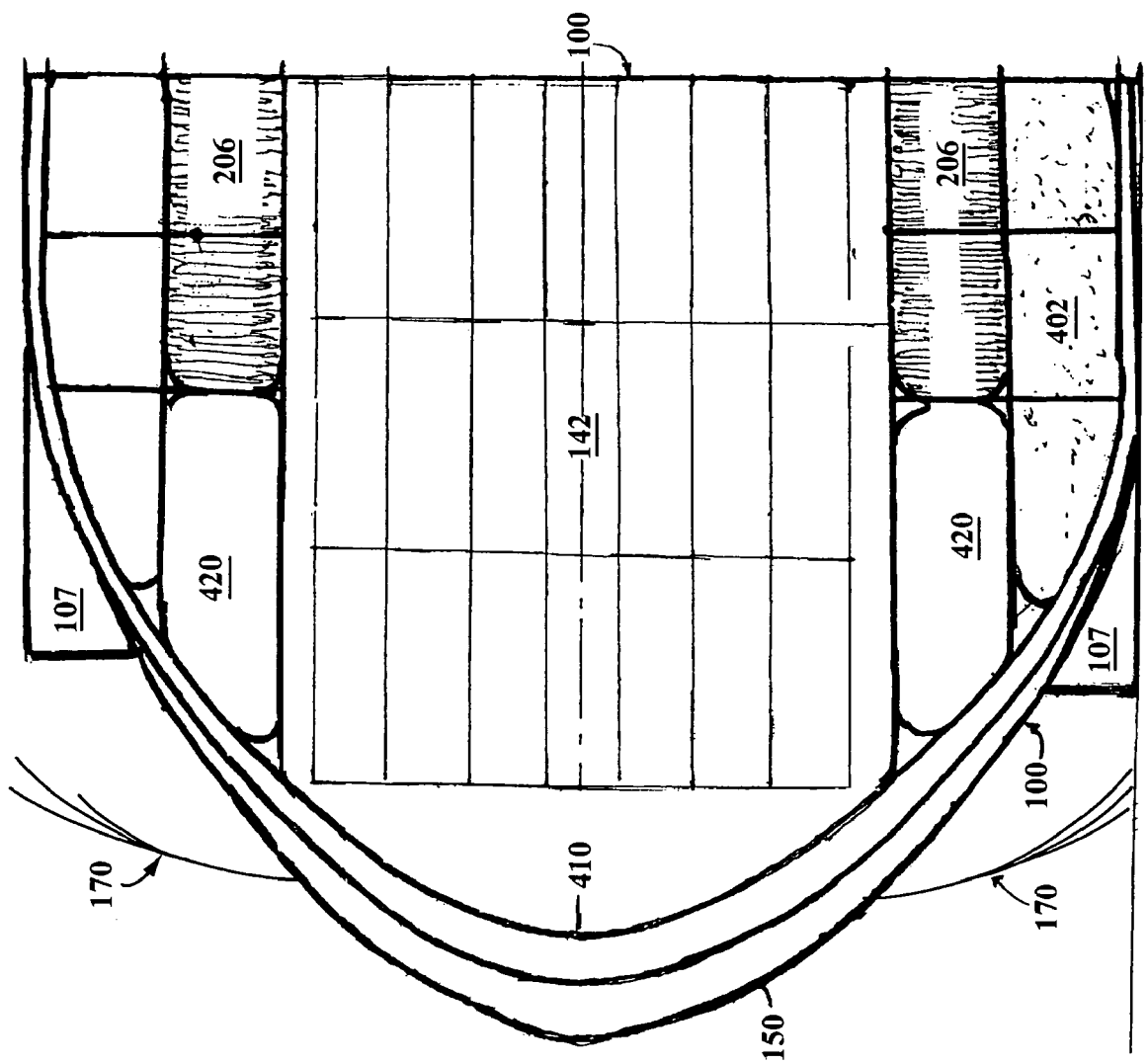
FIG. 6 is a top plan view of the prow of the container ship of FIG. 1.

FIG. 6 is a top interior view of prow 150 of ship 100 that shows the SBPM System 107 and SBW 170, extending outwardly from the starboard and port of the prow 150 of ship 100 that is described in connection with FIGS. 13-15 below. Within prow 150, is the pollution management E-microsystem space 410 and starboard and port anchor system areas 420 as well as the distilled clean water storage system 202 and the water and methanol mix fuel for fuel cells starboard storage system 206, each containing typical vertical partial separators and structural system 402. Also shown in FIG. 6 is the second level zone for containers 142 that are located above the storage area shown in FIG. 7.

Figure 7:
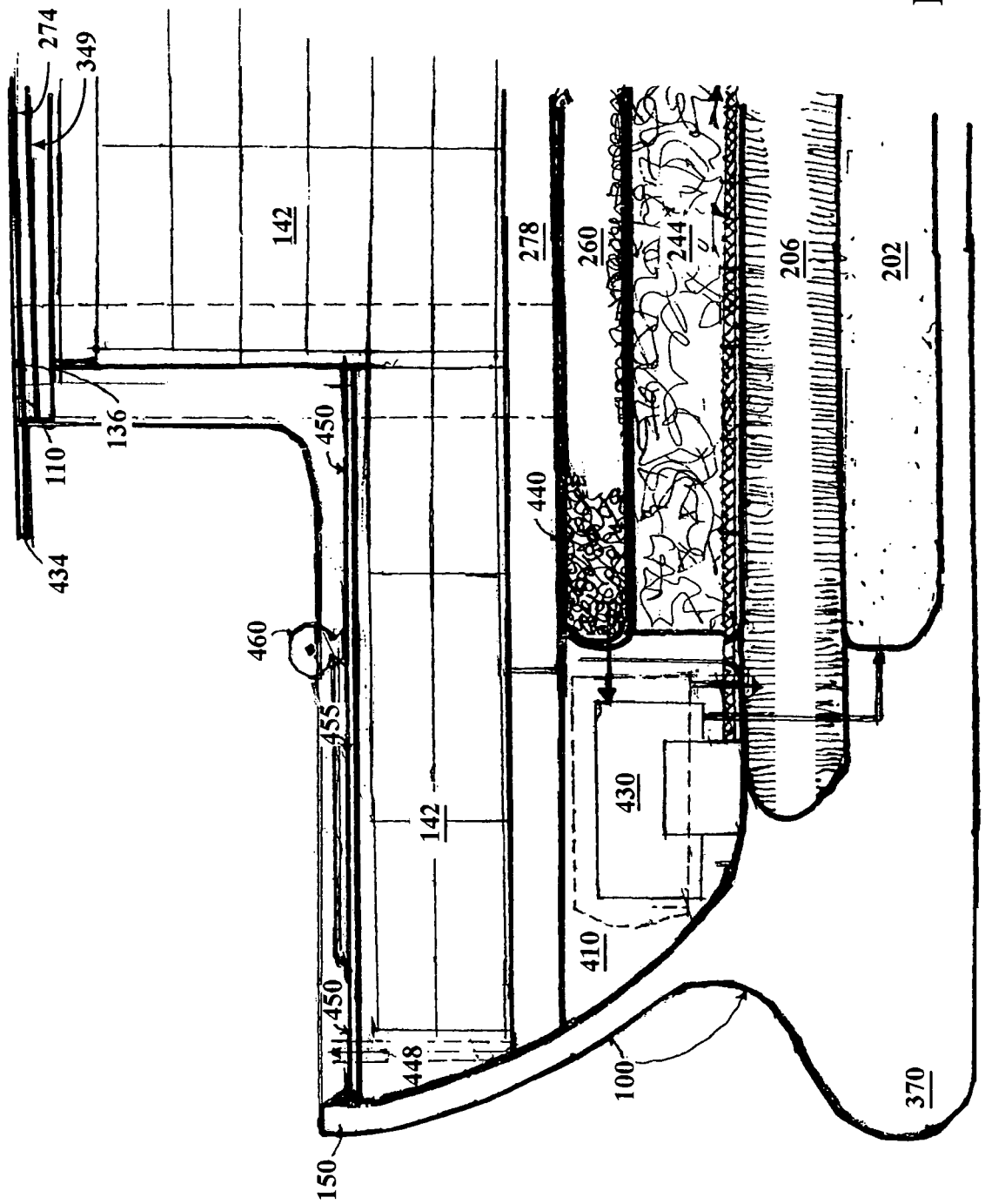
FIG. 7 is a cross-section side view of the prow of the container ship of FIG. 1.

FIG. 7 is side elevation view of the interior of prow 150 of ship 100 that includes two levels of containers 142, interstitial horizontal access 278 for crew support/maintenance and miscellaneous cargo, pollution management E-microsystem space 410, components 430 of the pollution portion of an E-Microsystem within E-microsystem space 410, hydride fuel storage 260, biomass storage level 244, water and methanol mix storage 206, and the distilled clean water storage system 202. Components 430 are same as the components of E-macrosystem described below in connection with FIG. 8 and are capable of producing in the range of about 100 KW to 1 Megawatt of electrical energy. A storage envelope 440 for storing nickel hydride for the manufacture of tertiary hydride is encased in steel armor on the exterior, sandwiched with a suitable insulation and kept refrigerated by means of cooling piping to maintain low temperature. A storage envelope of similar construction is used for hydride fuel storage 260 for fuel cells 184 located in the stern 114. Cantilevered fixed PV awning 434 is located at the level of main hatch PV doors 110. Vertical crew stairs/elevator access 448 leads to deck 450 of prow 150 having prow hatch cover Powerlight PV surface 455. Mounted on deck 450 are anchor winch system 460. Within spine 136 is located the oxygen storage level 274 and below oxygen storage level 274 is a well insulated thermal duct 349. Prow 150 has a standard bulb protection nose 370 for a super cargo container ship.

Figure 8:
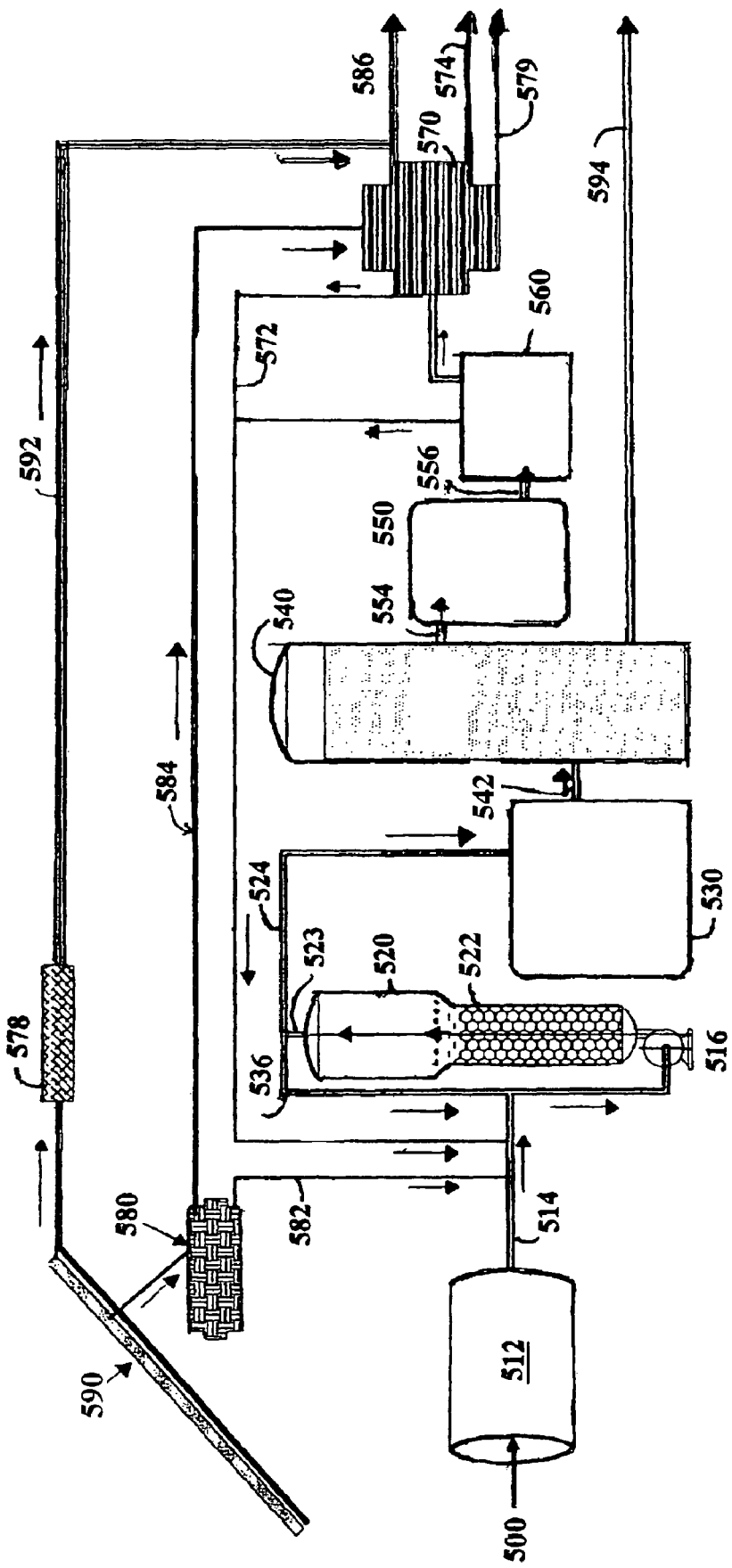
FIG. 8 is a process flow diagram of a prior art waste-to-energy conversion system.

FIG. 8 is a schematic process flow diagram of a prior art waste-to-energy system that can be modified to serve as the E-Microsystem and the E-Macrosystem for use in ship 100. This prior art system is described in greater detail in U.S. Pat. No. 6,308,465, the description of which is incorporated by reference herein. In this system, the waste passes via line 500 into rotary waste feeder 512 to convert the waste to a gas. The gas output from feeder 512 is sent via feed line 514 and pump 516 to a high temperature steam reformer 520 containing fluidized catalytic bed 522. The high temperature steam reformer 520 converts the waste gas into fairly pure "balanced" syngas at temperatures in the range of about 400° to about 700° C. The balanced syngas is passed from outlet 523 through line 524 to a methanol synthesis plant 530. A portion of the syngas is recycled to feed line 514 through line 536 to maintain minimum fluidization velocity. The methanol recovered from methanol plant 530 is passed to a methanol storage tank 540 via line 542. Methanol from tank 540 is converted to syngas in low temperature steam reformer 550 after passing via line 554. The syngas from reformer 550 is passed via line 556 to a selective oxidation catalyst heat exchanger 560 to convert the CO to $CO_2$, which is recycled through line 562 to feed line 514. The hydrogen is in fluid communication via line 568 with the first half-cell of a currently commercially available fuel cell 570. Such fuel cells include an alkaline Apollo™ Fuel Cell ("AFC"), with circulating liquid electrolyte, a PEM (Proton Membrane Exchange) fuel cell or other solid oxide fuel cell alternatives. The exit gas from the first half-cell consisting mostly of water vapor passes through line 572 to be recycled to feed line 514 with the $CO_2$ in line 562. Electrolyzer 580 energized with the electricity 574 generated in fuel cell 570 and from solar PV panels 590 decomposes water into hydrogen and oxygen. The hydrogen is fed via line 582 to feed line 514 to assure that a balanced syngas is produced and passed to methanol plant 530. The oxygen from electrolyzer 580 passes via line 584 to the second half-cell of fuel cell 570 to serve as the optimum oxygen-containing gas for the fuel cell cathode for the production of electricity 574 and thermal energy 586. Thermal energy 592 that is also generated from solar PV panels 590 is combined with thermal energy 586 generated by fuel cell 570 to complete the energy balance of this schematic process. Any excess thermal energy 586 can be sold or stored in a thermal energy storage unit 578. Distilled water from fuel cell 570 is passed through 579 to storage. The excess methanol from tank 550 in line 594 can be used as a fuel source as described above.

Figure 9:
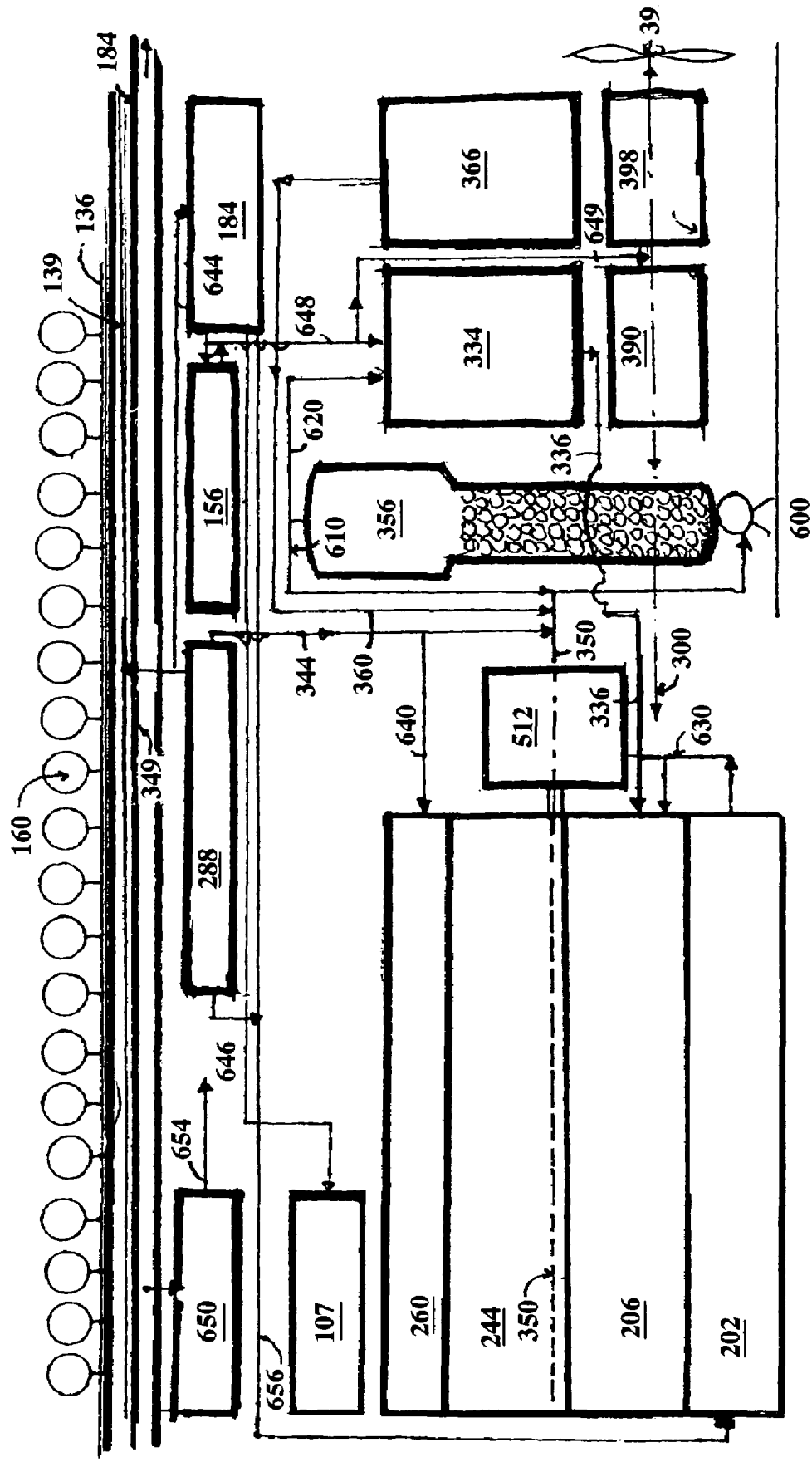
FIG. 9 is a generalized schematic process flow diagram of a waste-to-energy conversion system used in the process of the present invention for converting sea biomass materials into energy within the stem of the container ship of FIG. 1.

FIG. 9 schematically illustrates the E-Macrosystem 194 for use in ship 100. The biomass waste stored in the continuous wrap-around biomass storage system 244 is fed via hot screws 250 to rotary waste feeder 354 to convert the biomass to a gas. The gas is passed via main line 350 and steam reformer pump 600 to high temperature steam reformer 356. Hydrogen in line 344 from electrolyzer system 288, carbon dioxide in recycle line 360, and product syngas from steam reformer 356 in line 610 are passed into main feed line 350 and also pumped into steam reformer 356 via pump 600. The syngas from steam reformer 356 is passed through line 620 to methanol plant 334. Methanol from plant 334 is passed via methanol line 336 to methanol storage 206. Distilled water in water storage 202 can be passed to methanol storage 206 to regulate the proper amount of water in the water-methanol mixture by mix regulator 630. A portion of the syngas from reformer 356 is passed to selective oxidation catalyst heat exchanger 366 to convert the carbon monoxide to carbon dioxide, a portion of which is recycled via line 360 to main line 350. The remaining portion of the carbon dioxide is passed to fuel cells 184, which include high temperature basic SOFC (solid oxide fuel cell) and alkaline fuel cells (AFC). Electricity from fuel cells 184 is stored in electric traction battery storage system 156. Electrolyzer 288 is supplied with electricity from storage system 156 to decompose water from water storage 202 to hydrogen and oxygen. A portion of the hydrogen is passed to reformer 356 as indicated above. The remaining portion of hydrogen is passed via line 640 to the hydride storage 260. A portion of the oxygen from electrolyzer 288 is passed via line 644 to the second half-cell of fuel cell 184 to serve as the optimum oxygen-containing gas for the fuel cell cathode. Another portion of the oxygen from electrolyzer 288 is passed to the medical oxygen storage tanks 166 mounted below spine 136. Electricity passes through electrical line 646 to operate the SBPM Pollution process system 107 and the biomass hot screw feeding system 350. Electricity also passes through lines 648 and 649 to respectively operate methanol plant 334 and electric turbines 398 and their auxiliary electric turbines 390 for either the ship's screws propulsion and guidance system or the jet propulsion and guidance system options. The ship's solar arrays of solar tracking concentrators/Stirling engine 160 also generate thermally produced electricity that is sent to the electric traction battery storage system 156. Thermal energy from fuel cells 184 is stored in thermal energy storage system 650. A portion of the thermal energy from storage system 650 is transferred through heat utilization line 652 to the control tower/crew quarters 116 and other location throughout ship 100. Distilled water from fuel cells 184 is passed through line 656 to clean water storage 202.

Figure 11:
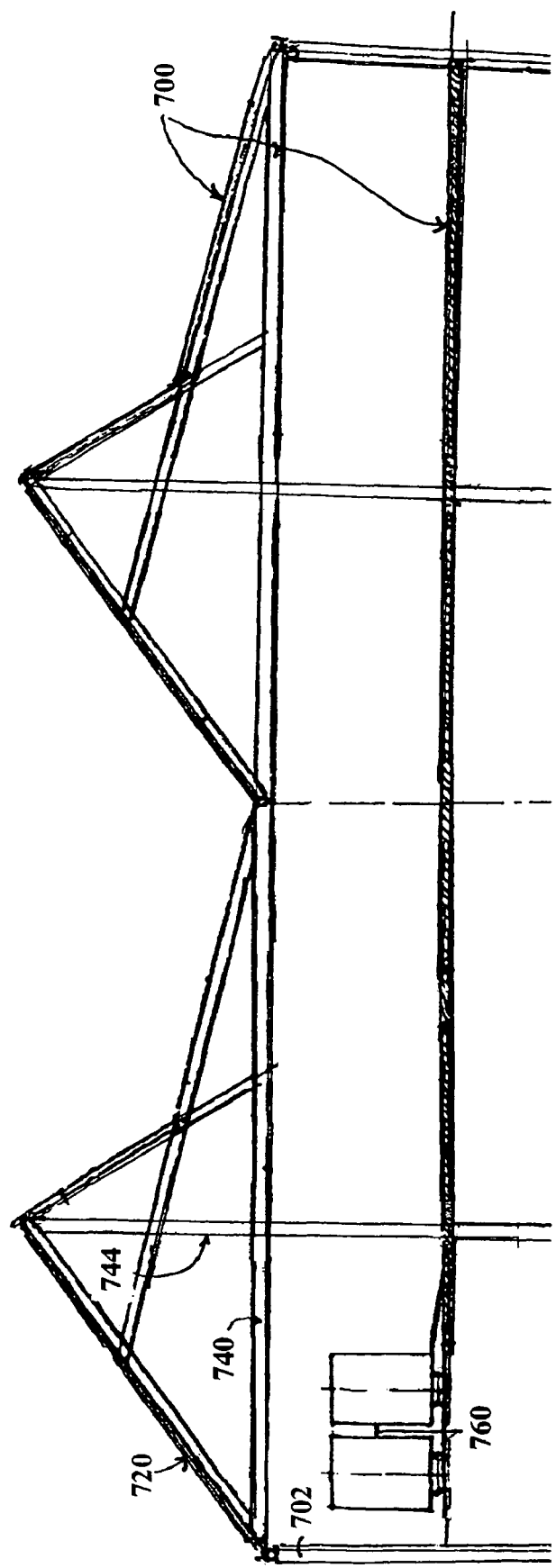
FIG. 11 is a cross section of the port-side storage facility shown in FIG. 10.

In FIGS. 10-11, a port-side storage facility 700 is shown. Ship 100 is docked to load containers 142 from the dock 704. PV hatch cover doors 110 are open 90 degrees to receive containers 142 from a typical loading/unloading gantry 708 having a gantry boom 710. A set of pipes and pumps 714 is for filling ship's liquid holds. Loading equipment 716 is for loading miscellaneous cargo. Regular PV arrays of the Powerlight PV roofing 720 for facility 700 are substantially the same as the ship's PV solar system. PV roofing 720 supplies auxiliary power for the operations of the port-side facility 720. Port storage tanks 730, 732, and 734, and 736 are for methanol and water mix; distilled clean water; and oxygen offloaded from ship 100. Storage tanks 736 are to store the waste biomass for loading onto ship 100.

Facility 700 is a typical TCM structure occupying 105,800 sq. ft. constructed from long span, e.g., about 49 long cantilevered truss and column system, a longitudinal TCM on center/ 24 spans 744 of approximately 115 ft. in length plus two-20 ft. cantilevered overhang ends, and the TCM 67.5 ft. cross beam truss system and cantilevered truss frame. Eight column (4 on each side) are large fixed end units 702 with a hinge connecting the cantilevered truss frames and utilized as lateral force resisting elements. Facility 700 has sufficient height for the steam reformers of the 7.5 MW E-Macrosystem 192 that occupies 15,000 sq. ft. The total power plant including the solar system of facility 700 is capable of providing 4,100 kWHr/day on clear days. Facility 700 has a double track railcar service system 760 for the delivery of biomass and other materials.

Figure 12:
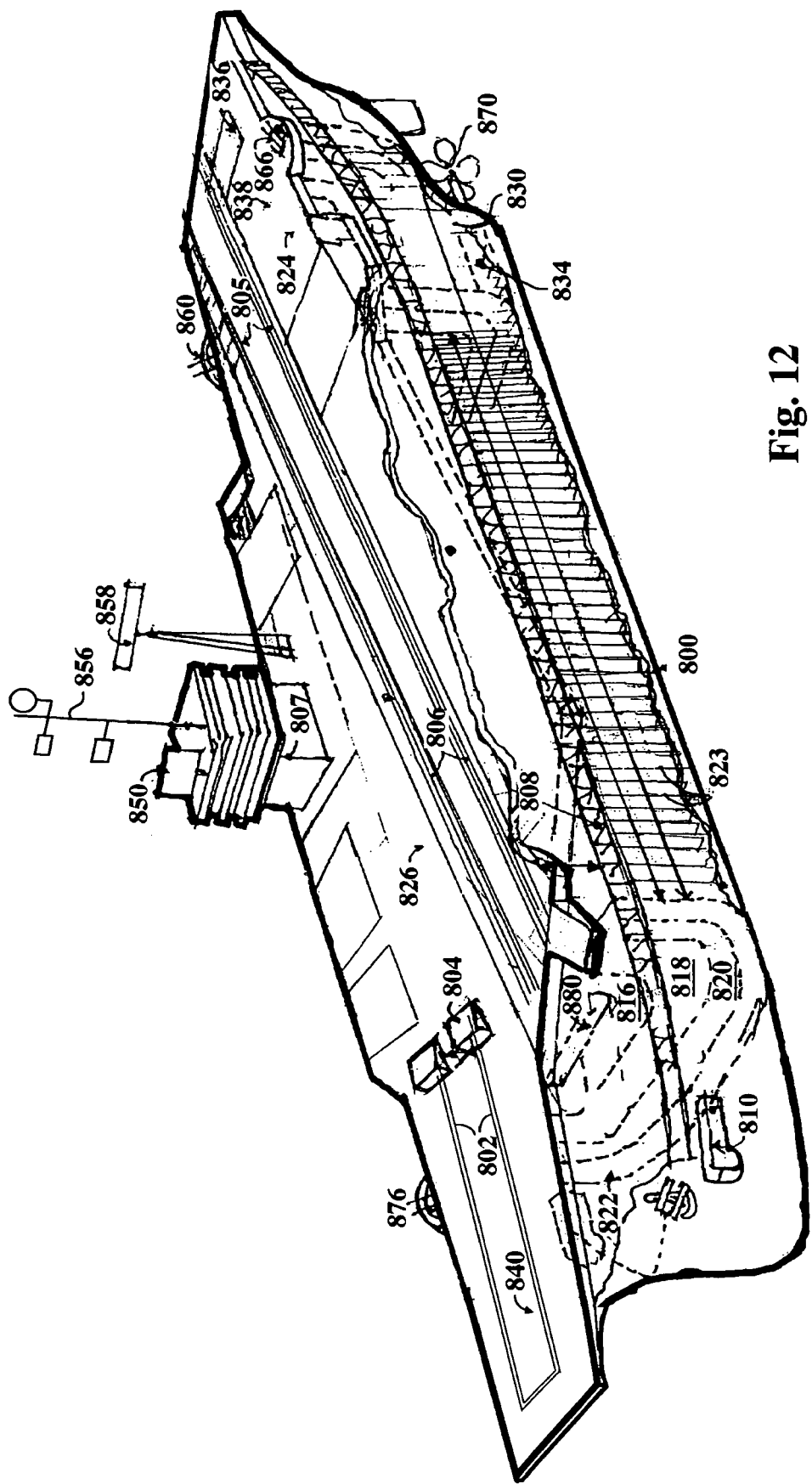
FIG. 12 is an overall perspective of a Nimitz Class aircraft carrier modified to carry out another embodiment of the process of the present invention for converting sea biomass and biomass waste materials into energy.

FIG. 12 shows a Nimitz Class aircraft carrier 800 in accordance with another embodiment of the process of the present invention. In this embodiment, the Nimitz Class aircraft carrier 800, is equipped with a conventional steam catapult tracks 802, catapults 804, middle landing/takeoff strip 805, aircraft landing/takeoff tracks 806, the command and control tower 807, and carrier's crew quarters 808. Carrier 800 has also been modified to carry out the process of the present invention for converting sea biomass and waste materials into energy. Specifically, carrier 800 is also equipped with the same type of SBPM system 810, hydride storage 816, biomass storage system 818, methanol and water mix storage 820, and distilled water storage system 822, as discussed above in connection with FIGS. 1-9. The storage area on carrier 800 has a width, W'''', and is divided into vertical compartments with dividers 823. Carrier 800 also has special Powerlight PV roofing system 824 and aircraft elevator lifts and deck surface solar PV arrays 826 to provide substantially the conversion of solar energy to electrical energy as ship 100 discussed above. The power plant 830 is located in the stem and contains the same equipment described above in connection with carrier ship 100. A power plant fire wall 834 separates the power plant 830 from the carrier's storage area. A power plant lift 836 and lift access 838 provides the access to power plant 830 from the deck. A fuel storage access lifts 840 provides access to the storage areas of carrier 800. Finally, carrier 800 is equipped with a conventional radar tracking system 850 on the tower 807, radio system antennae 856, radar antennae 858, anti-aircraft battery turret 860, anti-aircraft turret 866, the carrier's screw option 870, gun turret 876 and the carrier's magazine 880.

Figure 13:
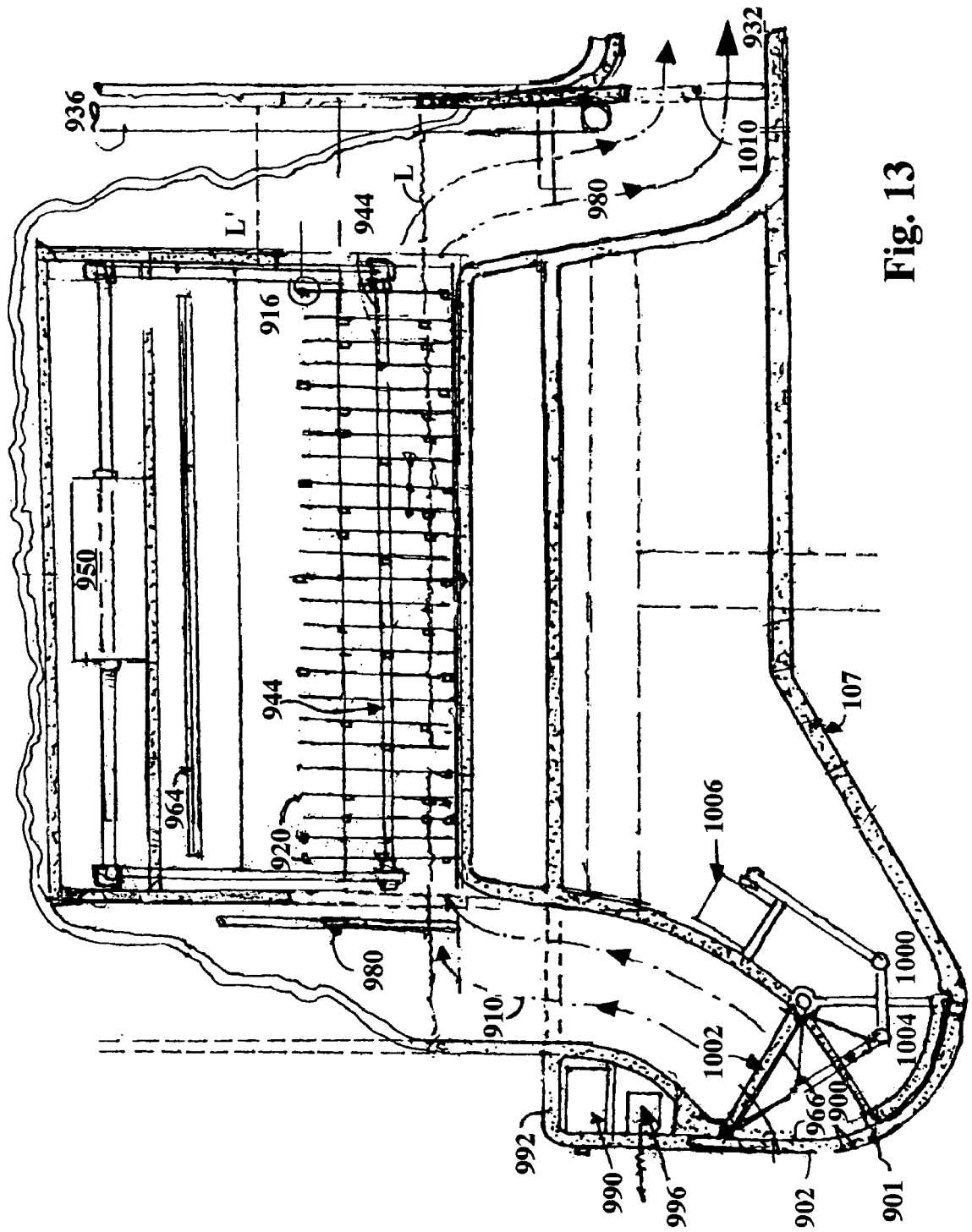
FIG. 13 is a lateral cross sectional view taken along line 13-13 of FIG. 2A showing a sea biomass pollution management (SBPM) system of the process of the present invention.
Figure 14:
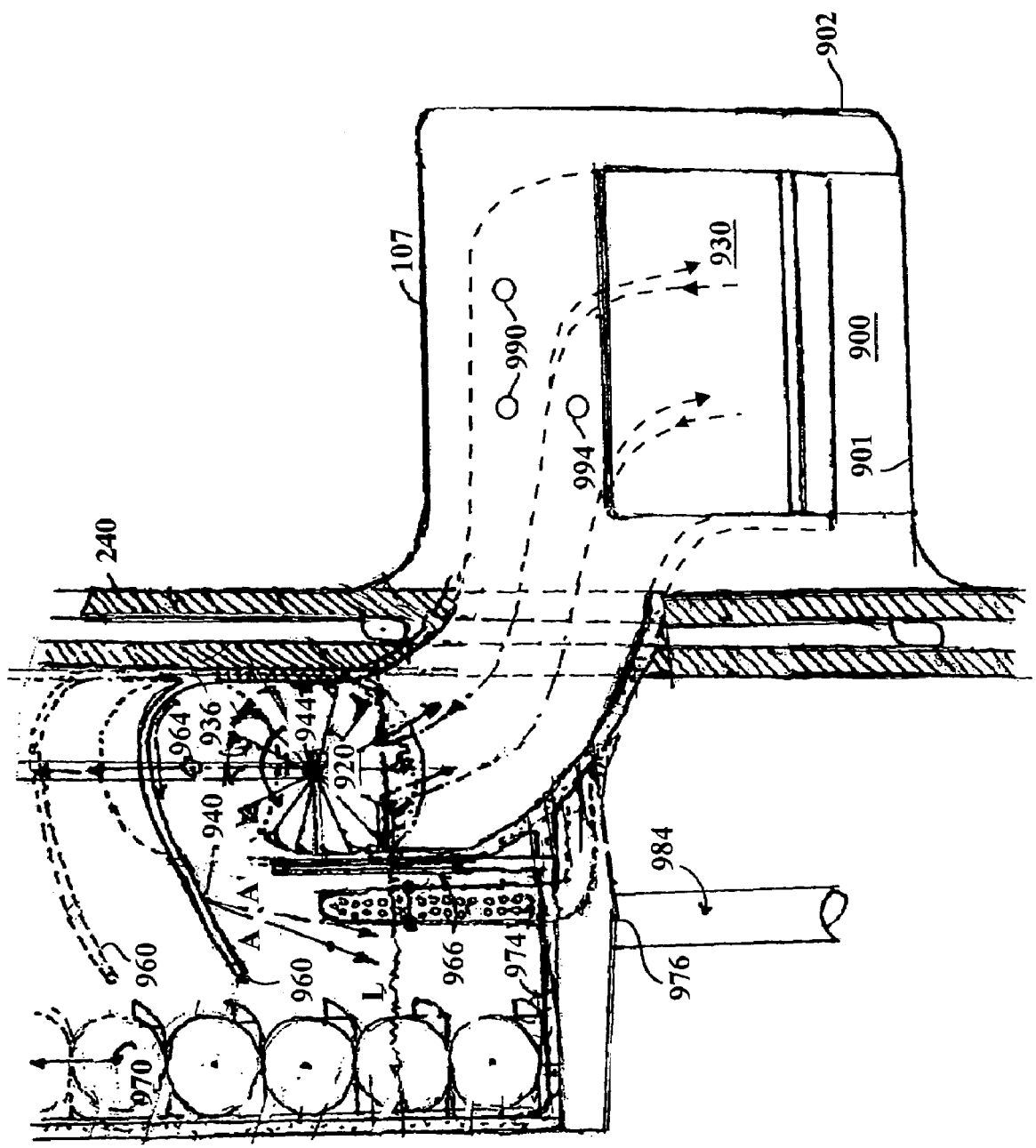
FIG. 14 is a transverse cross sectional view taken along line 14-14 of FIG. 2A showing the SBPM system.
Figure 15:
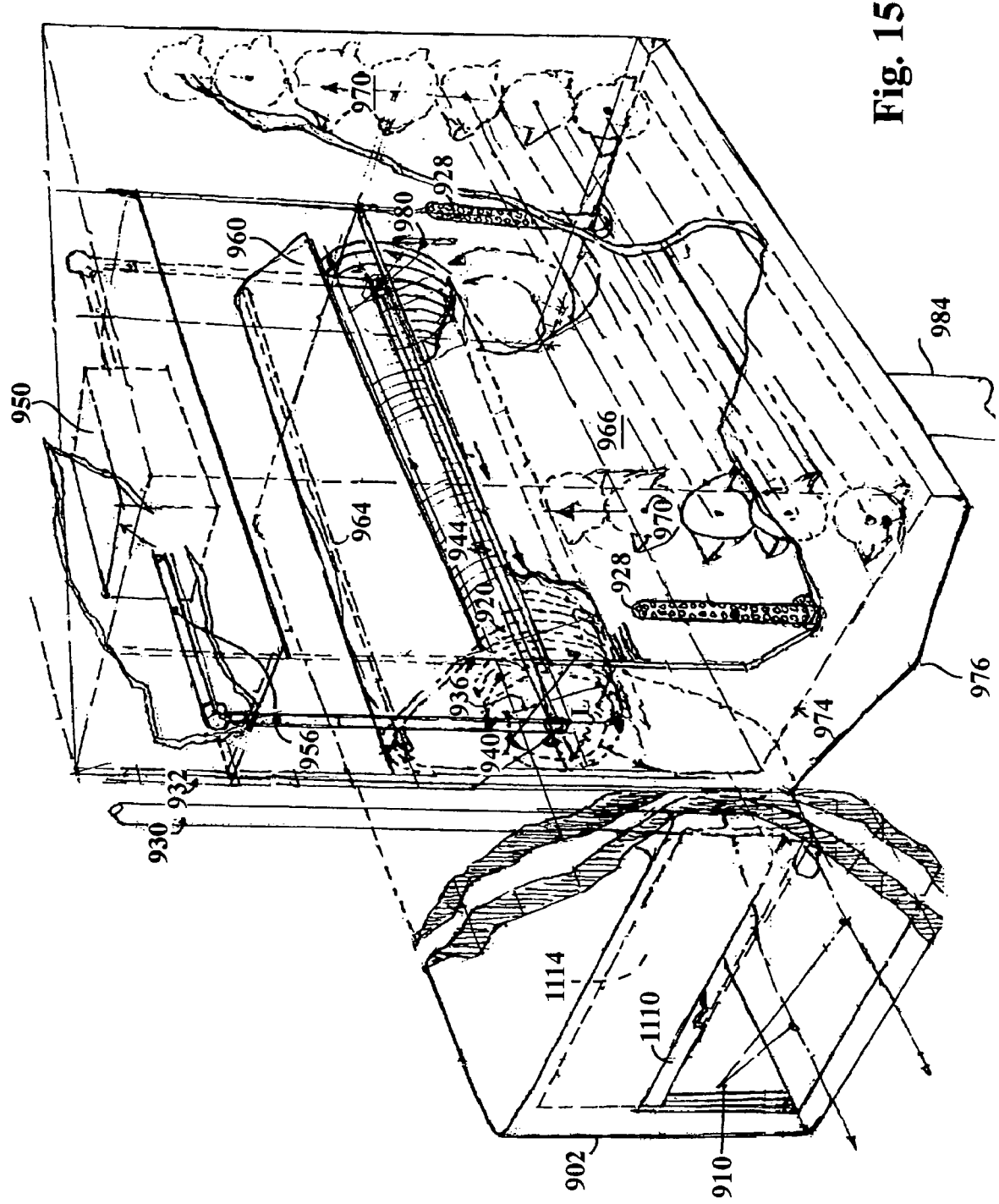
FIG. 15 is a perspective view of the SBPM system.

FIGS. 13-15 show the details of the SBPM Pollution process system 107, which is a critical element of the process of the present invention. Specifically, FIGS. 13-15 show a continuous flow of sea water entering through intake 900 on the bottom 901 of a front section 902 of SBPM system 107 mounted on the exterior of both the port and starboard sides of ship 100. The sea water then passes through channel 910 that connects intake 900 through double hull 198 of ship 100 to a mid section 916 of SBPM system 107. The sea water passes over a high speed biomass rotating flipping unit 920 in mid section 916 and through sea water drainage unit 928 that strains the biomass from the sea water. The processed sea water leaves the SBPM system 107 through outlet flow channel 930 and outlet flow pipe 932. Drainage unit 928 is designed to separate sea biomass from seawater. Mid section 916 of the SBPM system 107 is accessible from access 400 so that the flipping unit 920 can be serviced. Adjacent outlet flow pipe 932 is a suction intake pipe 936 to collect processed sea water to determine its quality before leaving SBPM system 107.

The flipping unit 920 that preferably consists of a plurality of four-point arms 936 made of titanium and/or TCM and having clawed spoon shaped ends 940 mounted at 90 degrees on a horizontal titanium shaft 944 having an estimated diameter of 2 inches. The arms 936 are set at alternate fixed position settings that vary by 45 degrees, e.g., 45 degrees, 90, 135, 180, and 270 degree alternate settings. The spoon shaped ends 940 are welded to arms 936 having an estimated diameter of 0.75 inch. The end four-arm set at 90 degrees vertical and repeated every $4^{th}$ interval with the 3 other four-arm elements staggered at the angles specified above. A high speed motor 950 and high speed geared drive shafts 956 is operably connected to the computer control system at the control center 116 and rotates shaft 944 counterclockwise, preferably at speeds up to about 2 RPM, to cause the sea biomass to be deflected off a flipper directing/deflector shield 960 into transient biomass storage bin 966. The anticipated angles of deflection, A and A', of the biomass into the bin 966 for processing are shown in FIG. 14. Shield 960 is cleaned with the automatic clean water spray system 964. The biomass is conveyed via biomass conveyor system 970 from bin 966 to biomass chutes 240 where the biomass falls by gravity into biomass storage system 244. The floor 974 of biomass bin 966 is sloped toward conveyor system 970 from the bottom of a though 976 as shown in FIGS. 14-15.

An optical crest sensor 980 is operably connected to the computer control system at the control center 116 computer to allow one to lower or raise a biomass hydraulic elevator 984 equipped with a high speed braking system, At the normal sea water crest level, L, conveyor system 970 is located as shown in FIG. 14. However, if the crest rises to L', raising hydraulic elevator 984 causes conveyor system 970 to rise as shown in dotted lines for conveyor 970 in FIG. 14.

For the protection of marine life, two TV cameras 990 are mounted adjacent the top 902 of front section 902 and are operated from the central control unit 116, either independently or for simultaneous operation. In addition, two low level sonars 994 are mounted below cameras 990 to warn fish and other marine life. Intake 900 has bars 996 to prevent entry of large fish, dolphins and other sea mammals. Finally, intake 900 can be completely closed with an intake closure device 1000. Device 1000 includes closure 1002, universal gears, shafts motorized arms 1004 and motor system 1006 that is controlled by the central computerized system. in control center 116. A motorized drop closure gate 1110 is mounted within outlet flow pipe 932 that is controlled by central control system 116. Drop down gate 1110 is primarily closed during a storm and is stored within pocket 1114 when in the open position.

The foregoing description of the super cargo container ship 100 illustrated in FIGS. 1-7, 9-12, and 13-15 is far more fuel efficient with greater fuel storage capacity with the conversion to biomass and solar energy in lieu of fossil fuels. The storage capacities based on the above description of ship 100 are as follows: (1) 976,937 gallons of clean water; (2) 581,778 gallons of methanol and water mix (an auxiliary fuel for on-board fuel cells 184; (3) 4,836,000 cu. ft. or 6,045 tons of total biomass that can be converted into 10 megawatts (MW) of electrical power to last approximately 60.5 days; (4) 945,000 cu. ft. or 4,400 tons of hydrogen stored in the form of hydride for use as an auxiliary fuel for fuel cells; 28,800 cu. ft. medical oxygen; and 2,658 containers. The peak solar output of ship 100 is calculated to be in the range of about 4 to 5 MW based on 7,000-4 ft. by 6 ft. PV solar panels at 300 watts each and 240 concentrators. The total power plant output including the solar energy is about 14 to 15 MW or an estimated 8,210 kWH/day. Assuming that ship 100 travels in seas containing rich supplies of algae, kelp, marine organic materials and similar sea biomass, the SBPM system 107 has a very rich harvesting source for fuel for fuel cells. The range of ship 100 is virtually unlimited due to fuel capacities in the use of continuously harvested biomass plus the approximately 4 to 5 MW of solar energy. The electric traction battery storage system 156 exists to satisfy the overall energy balance of ship 100 as well as for emergencies.

Further, without departing from the spirit and scope of this invention, one of ordinary skill in the art can make various other embodiments and aspects of the process and system of the present invention to adapt it to specific usages and conditions. As such, these changes and modifications are properly, equitably, and intended to be, within the full range of equivalents of the following claims.

What is claimed is:

1. A process for converting biomass into energy to power a marine vessel comprising:
   a) conveying a carbonaceous waste material from a port-side storage facility to a on-board biomass storage system;
   b) harvesting biomass materials from the sea by continuously passing sea water from an intake mounted on the exterior of the vessel through an on-board biomass removal system, said removal system includes a flipping unit that flips the biomass materials into an on-board transient biomass holding bin and a drainage unit that strains the biomass materials from the sea water, the drainage unit being positioned within the holding bin after the flipping unit, the flipping unit comprising a plurality of arms having spoon-shaped ends on a shaft;
   c) returning the sea water from the drainage unit to the sea through an outlet;
   d) conveying the biomass materials from the on-board biomass holding bin via a rotary feeder to the on-board storage system;
   e) conveying the biomass from the on-board storage system to a gasification unit, said gasification unit is a steam reformer and operates at temperatures in the range of about 400° to about 1600° C.;
   f) converting the biomass in the steam reformer to synthesis gas; and
   g) passing at least a portion of the synthesis gas from the steam reformer as fuel for a power system of the marine vessel.

2. The process of claim 1, wherein the biomass materials is sea biomass selected from the group consisting of kelp, algae, marine organic materials, and mixtures thereof harvested from the sea.

3. The process of claim 1, wherein the biomass removal system further includes a protection bar for preventing mammals and large fish from entering the intake.

4. The process of claim 3, wherein the biomass removal system further includes a video monitoring means mounted adjacent the intake for maintaining visual contact on the sea water entering the intake.

5. The process of claim 4, wherein in the biomass removal system further includes a sonar means mounted adjacent the intake for providing a warning to mammals and fish within sonar range of the intake pipe.

6. The process of claim 1 wherein a greenhouse gas stream recovered from the power system is recycled to the gasification unit.

7. The process of claim 1, wherein at least a portion of excess synthesis gas from the gasification unit is converted in an on-board chemical reactor into useful hydrocarbon products that are stored in an on-board storage facility.

8. The process of claim 1, wherein at least a portion of excess synthesis gas from the gasification unit is converted in a chemical reactor into methanol that is stored in an on-board storage facility.

9. The process of claim 7, wherein at least a portion of the useful hydrocarbon products are off-loaded from the marine vessel while conveying the carbonaceous waste materials at port-side onto the vessel.

10. The process of claim 8, wherein at least a portion of the methanol is off-loaded from the marine vessel while conveying the carbonaceous waste materials at port-side onto the vessel.

11. The process of claim 10, wherein another portion of the methanol is combined with water and the mixture is passed to a fuel cell to produce electrical energy used in the power system.

12. The process of claim 1, wherein at least a portion of the synthesis gas from the steam reformer is passed to a fuel cell to produce electrical energy used in the power system.

13. The process of claim 12, wherein at least a portion of the synthesis gas from the gasification unit is electrochemically oxidized in a first half-cell of a fuel cell (anode) to a first half-cell exit gas comprising carbon dioxide and water; and an oxygen-containing gas is electrochemically reduced in a second half-cell of said fuel cell (cathode) completing the circuit and resulting in the production of electrical energy used in the power system of the vessel.

14. The process of claim 1, wherein the biomass from the on-board storage system is conveyed via a rotary feeder to the gasification unit.

15. The process of claim 1, further comprising an on-board solar collector system to provide auxiliary power for the vessel.

* * * * *